US012795350B2

(12) United States Patent
Neuhaeuser

(10) Patent No.: US 12,795,350 B2
(45) Date of Patent: Nov. 10, 2026

(54) METHOD OF PROVIDING A COMMUNICATION FUNCTION IN A USER EQUIPMENT BY ACQUIRING SUPPORT INFORMATION FOR OBTAINING A COMMUNICATION PROFILE

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 565 days.

(21) Appl. No.: 18/096,615

(22) Filed: Jan. 13, 2023

(65) Prior Publication Data

US 2023/0232209 A1 Jul. 20, 2023

(30) Foreign Application Priority Data

Jan. 17, 2022 (EP) .................................... 22151849

(51) Int. Cl.

*H04W 8/20* (2009.01)
*H04L 9/40* (2022.01)
*H04W 8/18* (2009.01)

(52) U.S. Cl.

CPC ........... *H04W 8/205* (2013.01); *H04L 63/102* (2013.01); *H04W 8/183* (2013.01)

(58) Field of Classification Search

CPC ....... H04W 8/18; H04W 8/183; H04W 8/205; H04L 63/10; H04L 63/102

See application file for complete search history.

(56) References Cited

U.S. PATENT DOCUMENTS 9,456,409 B2 9/2016 Knudsen
2008/0066190 A1* 3/2008 Shu ....................... H04L 63/102 726/28
2015/0212807 A1* 7/2015 Elzein ..................... H04L 67/34 717/173
2017/0244837 A1* 8/2017 Kim .................. H04M 1/72409
2017/0289788 A1 10/2017 Lalwaney (Continued)

OTHER PUBLICATIONS

Extended European Search Report issued in European Application No. 22151849.1 dated Jun. 24, 2022 (10 pages).

*Primary Examiner* — Jeong S Park

(74) *Attorney, Agent, or Firm* — Crowell & Moring LLP

(57) ABSTRACT

A method of providing a communication function in a user equipment includes receiving, at the user equipment, a login request to log the user in to the user equipment; determining, by the user equipment, based on the login, whether the user equipment has a communication profile associated with the user; if it is determined that the user equipment has a communication profile associated with the user, enabling the stored communication profile; if it is determined that the user equipment does not have a communication profile associated with the user stored: sending, by the user equipment, a first request to a first server to request support information for obtaining a communication profile associated with the user; receiving, at the user equipment, the support information from the first server; and obtaining, by the user equipment, the communication profile from the first server or a second server based on the support information.

15 Claims, 3 Drawing Sheets

(56) References Cited

U.S. PATENT DOCUMENTS

| | | | | |
|---|---|---|---|---|
| 2019/0327605 | A1* | 10/2019 | Fan | H04W 8/205 |
| 2020/0264857 | A1* | 8/2020 | Koo | G06Q 20/16 |
| 2020/0322846 | A1* | 10/2020 | Hampali | H04W 8/205 |
| 2021/0211862 | A1* | 7/2021 | Chen | H04W 8/183 |
| 2022/0007172 | A1 | 1/2022 | Wang | |
| 2022/0109974 | A1* | 4/2022 | Li | H04W 12/06 |
| 2022/0330007 | A1* | 10/2022 | Li | H04W 8/183 |
| 2023/0023278 | A1* | 1/2023 | Foti | H04W 48/00 |

* cited by examiner

METHOD OF PROVIDING A COMMUNICATION FUNCTION IN A USER EQUIPMENT BY ACQUIRING SUPPORT INFORMATION FOR OBTAINING A COMMUNICATION PROFILE

CROSS REFERENCE TO RELATED APPLICATION

This application claims priority under 35 U.S.C. § 119 from European Patent Application No. 22151849.1, filed Jan. 17, 2022, the entire disclosure of which is herein expressly incorporated by reference.

BACKGROUND AND SUMMARY

Embodiments of the present disclosure relate to a method of providing a communication function in a user equipment, a computer readable storage medium, a management module for a communication module, and a user equipment. Embodiments of the present disclosure relate more particularly to the implementation of communication profiles, such as eSIM profiles, in user equipment, particularly in vehicles.

The use of wireless communication systems is rapidly increasing. In particular, a user may have a variety of devices that should be equipped with communication functions. Such devices may include a smartphone, a tablet, a smart watch, and a car. Due to certain restrictions imposed by a mobile network operator, it may be difficult or even impossible to flexibly provide personalized communication functions to user devices.

In view of the above, a new method of providing a communication function in a user equipment, a computer readable storage medium, a management module for a communication module, and a user equipment, that overcome at least some of the problems in the art are beneficial.

In light of the above, a method of providing a communication function in a user equipment, a computer readable storage medium, a management module for a communication module, and a user equipment are provided.

It is an object of the present disclosure to enable a communication function in a user equipment. In particular, it is an object of the present disclosure to flexibly provide personalized communication functions for different user equipment.

The objects are solved by the features of the claimed invention.

According to an independent aspect of the present disclosure, a method of providing a communication function in a user equipment, UE, is provided. The method includes: receiving, at the user equipment, a login request (e.g., from the user) to log the user in to the user equipment; and determining, by the user equipment, based on the login, whether the user equipment has (e.g., stored) a communication profile associated with the user.

Preferably, the login request is received at a user interface of the user equipment, or at an external entity connected to the user equipment. The external entity may be, for example, a mobile terminal that is wirelessly connected to the user equipment. The wireless connection may be established via a mobile network (e.g., a cellular network such as a 5G network), near field communication, Wi-Fi, or Bluetooth, but the present disclosure is not limited to these examples. For example, the external entity may be connected to the user equipment by one or more cables.

If it is determined that the user equipment already has a communication profile associated with the user, the method includes enabling the stored communication profile to provide the communication function for the user. The communication profile may be stored in the user equipment. In further embodiments, the user equipment may have a plurality of SIM cards (i.e., physical SIM cards) each being associated or associable with a respective communication profile. The plurality of SIM cards may be exchangeable and/or may be provided in an "exchange magazine".

If it is determined that the user equipment does not have a communication profile associated with the user, the method includes: sending, by the user equipment, a first request to a first server to request support information for obtaining a communication profile associated with the user; receiving, at the user equipment, the support information from the first server; and obtaining, by the user equipment, the communication profile from the first server or a second server different from the first server based on the support information.

According to some embodiments, which can be combined with other embodiments described herein, the communication profile is an eSIM profile of the user. Additionally, or alternatively, the communication profile is a personalized communication profile of the user.

The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, wherein a certain type of eSIM only works with a certain type of certificate.

The embodiments of the present disclosure are not limited to eSIM profiles, and other present or future network identifiers can benefit from the embodiments of the present disclosure.

According to some embodiments, which can be combined with other embodiments described herein, the method further includes enabling, by the user equipment, the communication profile obtained from the first server or second server.

According to some embodiments, which can be combined with other embodiments described herein, the enablement of the previously existing (e.g., stored) or downloaded communication profile is performed or granted only if the user is positively authenticated during the login process. The authentication may use a particular security level. For example, authentication may require the user to enter a password or key or perform Face ID. In some implementations, auto login without further protection may not be sufficient to enable the previously existing (e.g., stored) or downloaded communication profile.

According to some embodiments, which can be combined with other embodiments described herein, the first server is a management server or backend for managing a plurality of UE devices. For example, the first server can be owned and/or operated by a manufacturer of the UE devices, such as a car manufacturer. Accordingly, the first server can be an Original Equipment Manufacturer (OEM) server or backend. However, the present disclosure is not limited thereto, and the first server may be owned and/or operated by another third party.

According to some embodiments, which can be combined with other embodiments described herein, the second server is a mobile network operator, MNO, (or mobile virtual network operator, MVNO) server or backend. The MNO or MVNO can provide the communication profile for the user which should be downloaded and installed in the user equipment.

The MNO may also be referred to as a wireless service provider, wireless carrier, cellular company, or mobile network carrier, and is a provider of wireless communications services that owns or controls all the elements necessary to sell and deliver services to a user. In particular, the MNO owns or controls the elements of the network infrastructure necessary to provide services to subscribers (users) over a licensed spectrum.

The user equipment and the first server communicate via a transmission medium, such as a network. In a preferred embodiment, the network is a mobile network. The transmission medium may use any of various wireless communication technologies, or telecommunication standards, such as GSM, UMTS, LTE, LTE-Advanced (LTE-A), 5G, HSPA, and the like. A communication via future telecommunication standards is possible.

In some embodiments, the user equipment and the second server may communicate via the same network used for communication with the first server or a different network. In alternative embodiments, the user equipment does not communicate with the second server or communicates with the second server via the first server.

According to some embodiments, which can be combined with other embodiments described herein, the first request includes at least one of user equipment identification information (e.g., a Vehicle Identification Number, VIN), Subscriber Identity Module information (e.g., an EID), and user information. For example, the first request may always include the user information, and may optionally include the user equipment identification information and/or the Subscriber Identity Module information. The user information may be sent to the first server so that the first request can be mapped to a logged-in user. In some embodiments, the user information can be a Customer (C)-ID.

According to some embodiments, which can be combined with other embodiments described herein, the support information includes an activation code for the communication profile.

The activation code can be used to request the communication profile from the first server or the second server, in particular from an MNO. For example, the activation code may be sent to the UE's Local Profile Assistant (LPA), wherein the LPA uses the activation code to request a communication profile from the MNO, in particular a SM-DP+ of the MNO. In some embodiment, the activation code may include, or consist of, two parts: an SM-DP+ Address (e.g., a Fully Qualified Domain Name of the SM-DP+) and a matching ID or activation code token.

According to some embodiments, which can be combined with other embodiments described herein, the support information further includes at least one of Subscriber Identity Module information (e.g., an EID), a communication profile type (e.g., "personal" if the profile is assignable to one user only, or "default" if the profile is assignable to different users), user information (e.g., the C-ID), and a confirmation code (optional). The confirmation code can be used by the second server to verify that the user wants to use the communication profile in the user equipment.

According to some embodiments, which can be combined with other embodiments described herein, the step of obtaining, by the user equipment, the communication profile from the first server or a second server based on the support information includes sending, by the user equipment, a second request to the first server to request a download of the communication profile from the first server.

Preferably, the first server obtains the communication profile from the second server.

In further embodiments, which can be combined with other embodiments described herein, the step of obtaining, by the user equipment, the communication profile from the first server or a second server based on the support information includes sending, by the user equipment, a second request to the second server to request a download of the communication profile (e.g., directly) from the second server.

According to some embodiments, which can be combined with other embodiments described herein, the method further includes determining, by the user equipment, whether sufficient memory is available, e.g., on a storage medium of the user equipment, for installation of the communication profile.

The term "sufficient memory" is to be understood in the sense that the memory contains sufficient free storage to install and enable the communication profile. In some embodiments, the memory or total memory available for storing communication profiles may by preset. Optionally, the memory or total memory available for storing communication profiles may be changeable, e.g., in the user equipment and/or by the first server.

Preferably, the memory is provided by (a storage medium of) a Universal Integrated Circuit Card, UICC, also known as SIM card. In particular, the UICC may be an eUICC. The eUICC is a secure element that can contain one or more communication profiles, such as eSIM profiles. Each communication profile enables the eUICC to function in the same way as a removable SIM issued by the operator that created it. An eUICC may be built using any form factor from the traditional removable card to embedded formats soldered into devices.

According to some embodiments, which can be combined with other embodiments described herein, the method further includes, if it is determined that sufficient memory is available, installing the communication profile obtained from the first server or second server. The installing of the communication profile may be done according to the GSMA standard.

According to some embodiments, which can be combined with other embodiments described herein, the method further includes, if it is determined that sufficient memory is not available, deleting at least one other communication profile stored in the user equipment; and installing the communication profile obtained from the first server or second server. In other words, at least part of the storage medium is erased to provide sufficient capacity at least for the installation of the user's new communication profile.

According to some embodiments, which can be combined with other embodiments described herein, the at least one other communication profile is selected from the group including, or consisting of, an unknown communication profile, a least used communication profile, a recently least used communication profile, an oldest communication profile, and combinations thereof According to some embodiments, which can be combined with other embodiments described herein, the method further includes receiving, at the user equipment, a logout request to log the user out, in particular wherein the logout request is received via user input or automatically triggered by one or more events; and disabling the communication profile.

Preferably, the logout request is received at a user interface of the user equipment, or at an external entity connected to the user equipment. The external entity may be, for example, a mobile terminal that is wirelessly connected to the user equipment. The wireless connection may be established via a mobile network (e.g., a cellular network such as a 5G network), near field communication, Wi-Fi, or Bluetooth, but the present disclosure is not limited to these examples. In further embodiments, the logout request may be (e.g., automatically) triggered without explicit input from the user by one or more events. For example, the logout request may be triggered when the user leaves the vehicle, closes the vehicle, switches to another communication provide, and the like.

According to some embodiments, which can be combined with other embodiments described herein, the method further includes receiving, at the user equipment, a communication profile deletion request (e.g., from the user), in particular wherein the deletion request is received via user input or automatically triggered by one or more events; and deleting the communication profile according to the communication profile deletion request.

Preferably, the deletion request is received at a user interface of the user equipment, or at an external entity connected to the user equipment. The external entity may be, for example, a mobile terminal that is wirelessly connected to the user equipment. The wireless connection may be established via a mobile network (e.g., a cellular network such as a 5G network), near field communication, Wi-Fi, or Bluetooth, but the present disclosure is not limited to these examples. In further embodiments, the deletion request may be (e.g., automatically) triggered without explicit input from the user by one or more events. For example, the logout request may be triggered when the user leaves the vehicle, closes the vehicle, switches to another communication provide, and the like.

According to another independent aspect of the present disclosure, a machine-readable storage medium is provided. The machine-readable storage medium includes instructions executable by one or more processors to implement the method of providing a communication function in a user equipment of the embodiments of the present disclosure.

The term "machine-readable storage medium" includes various types of non-transitory memory devices or storage devices. The term "storage medium" is intended to include a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The storage medium may include other types of non-transitory memory as well or combinations thereof.

According to another independent aspect of the present disclosure, a system is provided. The system includes one or more processors; and a memory (e.g., the above machine-readable storage medium) coupled to the one or more processors and comprising instructions executable by the one or more processors to implement the method of providing a communication function in a user equipment of the embodiments of the present disclosure.

According to another independent aspect of the present disclosure, a user equipment is provided. The user equipment includes the machine-readable storage medium.

According to another independent aspect of the present disclosure, a management module for a communication module is provided. The management module includes a communication interface configured for communication with the communication module and a server; and a processor module.

The communication interface is configured to receive a login request (or information about a login). The login request may include at least one of a username, a password, a key, and the like.

The processor module is configured to: determine, based on the login, whether the communication module has (e.g., stored) a communication profile associated with the user; if it is determined that the communication module has (e.g., stored) a communication profile associated with the user, initiate enabling of the stored communication profile; and, if it is determined that the communication module does not have a communication profile associated with the user stored, send a request to a first server via the communication interface to request support information for obtaining a communication profile associated with the user.

The communication interface is further configured to receive the support information from the first server.

The management module is further configured to obtain the communication profile from the first server or a second server based on the support information.

According to another independent aspect of the present disclosure, a user equipment is provided. The user equipment includes the management module and the communication module.

According to some embodiments, which can be combined with other embodiments described herein, the user equipment is selected from the group including, or consisting of, vehicles and mobile terminals.

The term "user equipment" (UE) particularly includes computer devices which are mobile (e.g., vehicles) and/or portable (e.g., mobile terminals) and which are configured for wireless communication. Examples of UE devices include mobile telephones or smart phones, portable gaming devices, laptops, wearable devices (e.g. smart watches, smart glasses, smart shoes), PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication.

The term "vehicle" includes passenger cars, trucks, buses, campers, motorcycles, aircrafts, drones, ships, trains, etc., which are used to transport people, goods, etc. In particular, the term includes motor vehicles for the transport of persons.

The term "mobile terminal" includes in particular smartphones, but also other mobile telephones or cell phones, personal digital assistants (PDAs), tablet PCs, smart watches, smart glasses, and all current and future electronic devices that are equipped with communication technology.

Embodiments are also directed at devices for carrying out the disclosed methods and include device parts for performing each described method aspect. These method aspects may be performed by way of hardware components, a computer programmed by appropriate software, by any combination of the two or in any other manner. Furthermore, embodiments according to the disclosure are also directed at methods for operating the described user equipment and server(s). The disclosure includes method aspects for carrying out every function of the user equipment and server(s).

Other objects, advantages and novel features of the present invention will become apparent from the following detailed description of one or more preferred embodiments when considered in conjunction with the accompanying drawings.

DETAILED DESCRIPTION OF THE DRAWINGS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Although the embodiments of the present disclosure are described with reference to a vehicle, it is to be understood that the present disclosure is not limited thereto and that the embodiments described herein may be implemented in and/or used with a number of different types of UE devices, including but not limited to cellular phones, tablet computers, wearable computing devices, portable media players, vehicles, and any of various other computing devices.

Figure 1:
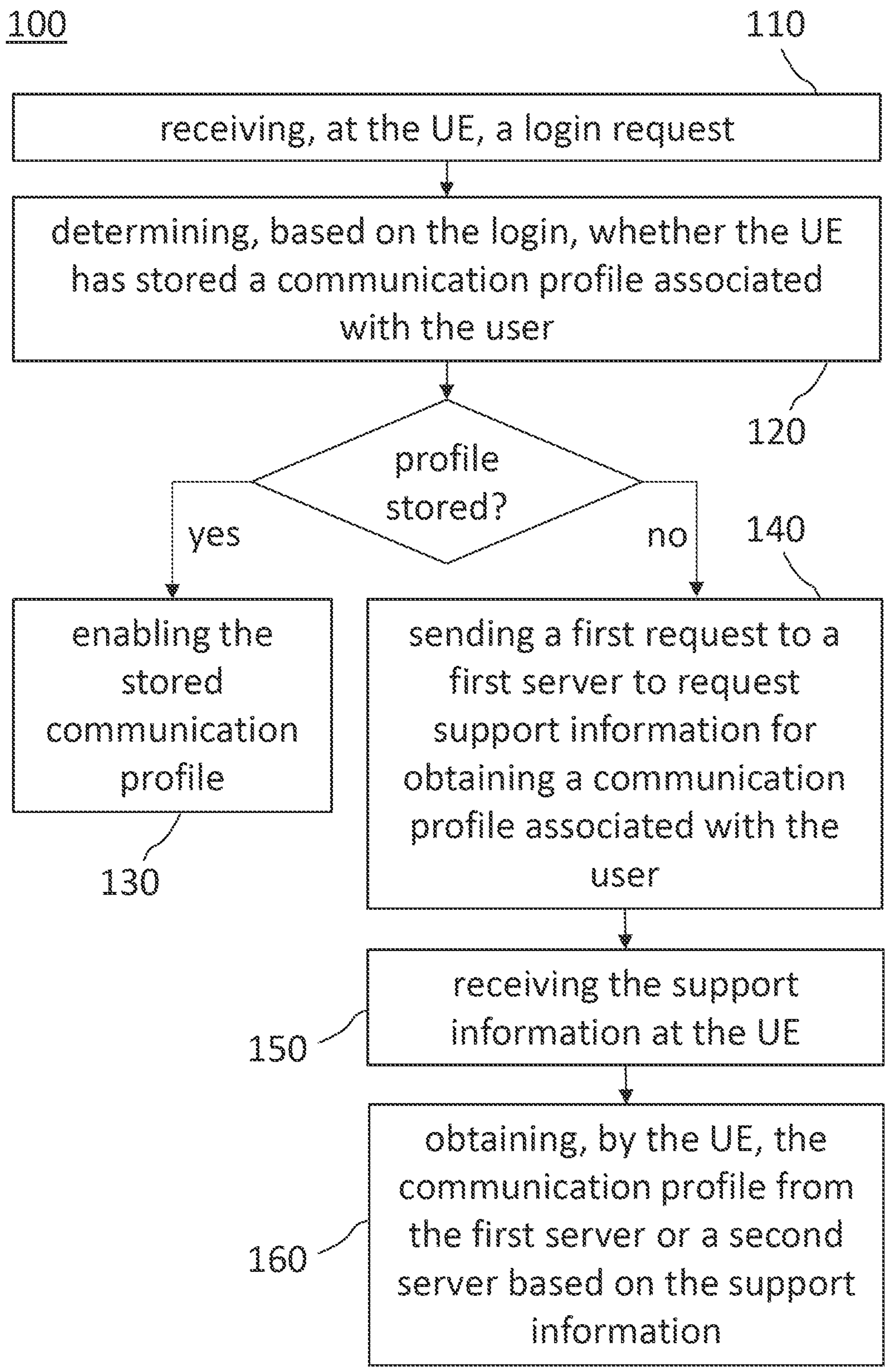
FIG. 1 shows a flow chart of a method for providing a communication function in a user equipment according to embodiments described herein.

FIG. 1 shows a flow chart of a method 100 for providing a communication function in a user equipment according to embodiments described herein.

The method 100 includes in block 110 receiving, at the user equipment, a login request from the user to log the user in to the user equipment; and in block 120 determining, by the user equipment, based on the login, whether the user equipment has stored a communication profile associated with the user.

In particular, the user is known to the user equipment through the login. This may be due to the possibility that during the login process the user equipment communicates with the first server, which may have stored all relevant information, e.g., in a user profile of the user. The user equipment may then obtain information necessary to determine whether the user equipment has stored a communication profile associated with the user.

In some embodiments, the communication profile is a CSIM or an eSIM profile
of the user.

The login request is received at a user interface of the user equipment, or an external entity connected to the user equipment. The user interface of the user equipment may be a Human Machine Interface (HMI), and may include, or be, a Touchscreen. The external entity may be, for example, a mobile terminal.

If it is determined that the user equipment has stored a communication profile associated with the user, the method 100 includes in block 130 enabling the stored communication profile to provide the communication function for the user.

Optionally, it can be checked whether communication functionalities, such as eSIM functionalities, have been previously enabled for the user (e.g., via a so-called onboarding). If not, the user may be directed to the account-federation with his/her MNO to enable eSIM functionalities. If it is determined that communication functionalities have been previously enabled for the user, block 130 may be executed. It is noted that this check can be done before or after the determining whether the user equipment has stored a communication profile associated with the user.

If it is determined that the user equipment does not have a communication profile associated with the user stored, the method 100 includes in block 140 sending, by the user equipment, a first request to a first server to request support information for obtaining a communication profile associated with the user; in block 150 receiving, at the user equipment, the support information from the first server; and in block 160 obtaining, by the user equipment, the communication profile from the first server or a second server based on the support information.

The first request may include at least one of user equipment identification information (e.g., a Vehicle Identification Number, VIN), Subscriber Identity Module information (e.g., an EID), and user information. The user information may be sent to the first server so that the first request can be mapped to a logged-in user. In some embodiments, the user information can be a Customer (C)-ID. It should be noted that the communication between the first server and the second server described later may not include the user information, such as the C-ID. Instead, communication between the first server and the second server may use a token generated by the second server.

According to some embodiments, the support information can include an activation code for the communication profile. The activation code can be used to request the communication profile from the first server or the second server.

In some embodiments, the support information further includes at least one of Subscriber Identity Module information (e.g., an EID), a communication profile type (e.g., "personal" if the profile is assignable to one user only, or "default" if the profile is assignable to different users), user information (e.g., the C-ID), and a confirmation code (optional). The confirmation code can be used by the second server to verify that the user wants to use the communication profile in the user equipment. In particular, the user can be asked whether he/she really wants to download the communication profile.

In some embodiments the method 100 may further include enabling, by the user equipment, the communication profile obtained from the first server or second server.

The step of obtaining, by the user equipment, the communication profile from the first server or a second server based on the support information may include sending, by the user equipment, a second request to the first server to request a download of the communication profile from the first server. Preferably, the first server obtains the communication profile from the second server using any suitable process.

Alternatively, the step of obtaining, by the user equipment, the communication profile from the first server or a second server based on the support information can include sending, by the user equipment, a second request to the second server to request a download of the communication profile from the second server. Accordingly, the user equipment may directly obtain the communication profile from the second server by communicating with the second server.

According to some embodiments, the method 100 further includes determining, by the user equipment, whether sufficient memory is available, e.g., on a storage medium of the user equipment, for installation of the communication profile.

Preferably, the memory is provided by (a storage medium of) a Universal Integrated Circuit Card, UICC, in particular an eUICC.

If it is determined that sufficient memory is available, the communication profile obtained from the first server or second server is installed e.g. on the eUICC. The installing of the communication profile may be done according to the GSMA standard.

If it is determined that sufficient memory is not available, at least one other communication profile stored in the user equipment can be deleted before the new communication profile is installed. The at least one other communication profile may be an unknown communication profile, a least used communication profile, a recently least used communication profile, and/or an oldest communication profile.

The term "sufficient memory" is to be understood in the sense that the memory contains sufficient free storage to install and enable the communication profile. In some embodiments, the memory or total memory available for storing communication profiles may by preset. Optionally, the memory or total memory available for storing communication profiles may be changeable, e.g., in the user equipment and/or by the first server.

According to some embodiments, the method 100 further includes receiving, at the user equipment, a communication profile deletion request from the user; and deleting the communication profile according to the communication profile deletion request. Preferably, the deletion request is received at the user interface of the user equipment, or the external entity connected to the user equipment.

In some implementations, the method 100 further includes receiving, at the user equipment, a logout request to log the user out; and disabling the communication profile. Preferably, the logout request is received at the user interface of the user equipment, or the external entity connected to the user equipment.

Figure 2:
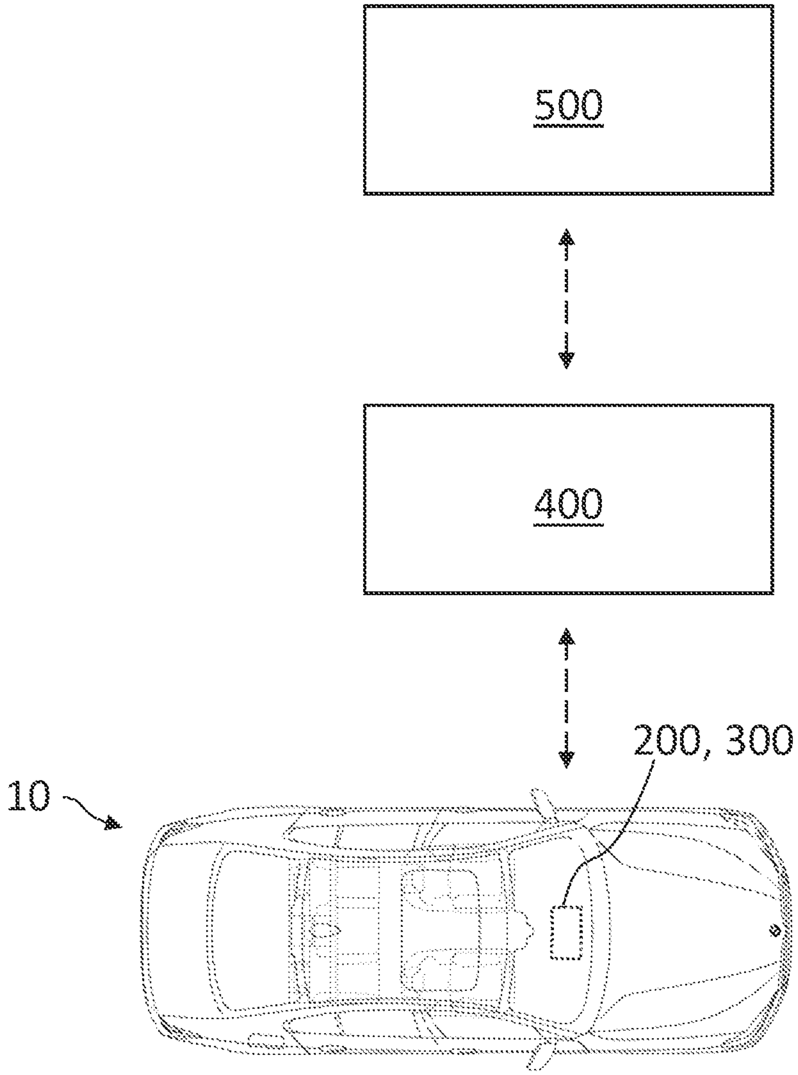
FIG. 2 shows a user equipment, a management server, and an MNO server according to embodiments described herein.

FIG. 2 shows a schematic view of a vehicle (UE) 10, a first server 400, and a second server 500 according to embodiments described herein. However, the present disclosure is not limited thereto, and the embodiments may be implemented in and/or used with a number of different types of UE devices, including, but not limited to, cellular phones, tablet computers, wearable computing devices, portable media players, and any of various other computing devices.

The vehicle 10 includes a communication module 200 and a management module 300 for the communication module 200. In some embodiments, the communication module 200 and the management module 300 are integrated in a single hardware and/or software module. In further embodiments, the communication module 200 and the management module 300 can be provided as separate hardware and/or software modules.

The term "module" as used throughout the present application may be understood in the sense of hardware components and software components or software instances which are designed to implement different tasks of the embodiments of the present disclosure.

The communication module 200 may include one or more sub-modules used for communication purposes, such as a Local Profile Assistant (LPA), a modem, and an eUICC.

The management module 300 may include a communication interface configured for communication with the communication module 200 and at least one server, such as the first server 400 and optionally the second server 500. For example, the communication interface may use a dedicated UE communication profile for communication with the at least one server via a mobile network. The dedicated UE communication profile can be provided in the management module 300, the communication module 200 (e.g., the eUICC of the communication module 200), or another module.

The vehicle 10 and the first server 400 communicate via a transmission medium, such as a network. In a preferred embodiment, the network is a mobile network. The transmission medium may use any of various wireless communication technologies, or telecommunication standards, such as GSM, UMTS, LTE, LTE-Advanced (LTE-A), 5G, HSPA, and the like.

In some embodiments, the vehicle 10 and the second server 500 may communicate via the same network used for communication with the first server 400 or a different network. In alternative embodiments, the vehicle 10 does not communicate with the second server 500 at all or communicates with the second server 500 via the first server 400.

According to some embodiments, the first server 400 is a management server or backend for managing a plurality of UE devices. For example, the first server 400 can be owned and/or operated by a manufacturer of the UE devices, such as a car manufacturer. However, the present disclosure is not limited thereto, and the first server 400 may be owned and/or operated by another third party.

Additionally, or alternatively, the second server 500 is a mobile network operator, MNO, server or backend. The MNO may also be referred to as a wireless service provider, wireless carrier, cellular company, or mobile network carrier. The MNO can provide the communication profile for the user which should be downloaded and installed in the user equipment.

The management module 300 includes the communication interface, and further includes a processor module to implement the aspects of the method described with respect to FIG. 1.

In particular, the communication interface can be configured to receive a login request from a user or information about a successful user login. The processor module is configured to: determine, based on the login, whether the communication module 200 has stored a communication profile associated with the user; if it is determined that the communication module 200 has stored a communication profile associated with the user, initiate enabling of the stored communication profile; and, if it is determined that the communication module 200 does not have a communication profile associated with the user stored, send a request to a first server 400 via the communication interface to request support information for obtaining a communication profile associated with the user.

The communication interface is further configured to receive the support information from the first server 400. The management module 300 is further configured to obtain (e.g., download) the communication profile from the first server 400 or second server 500 based on the support information and install the communication profile on, for example, the eUICC of the communication module 200.

In some embodiments, the communication profile obtained from the first server 400 or second server 500 and installed on the eUICC of the communication module 200 can be enabled by the LPA of the communication module 200.

Figure 3:
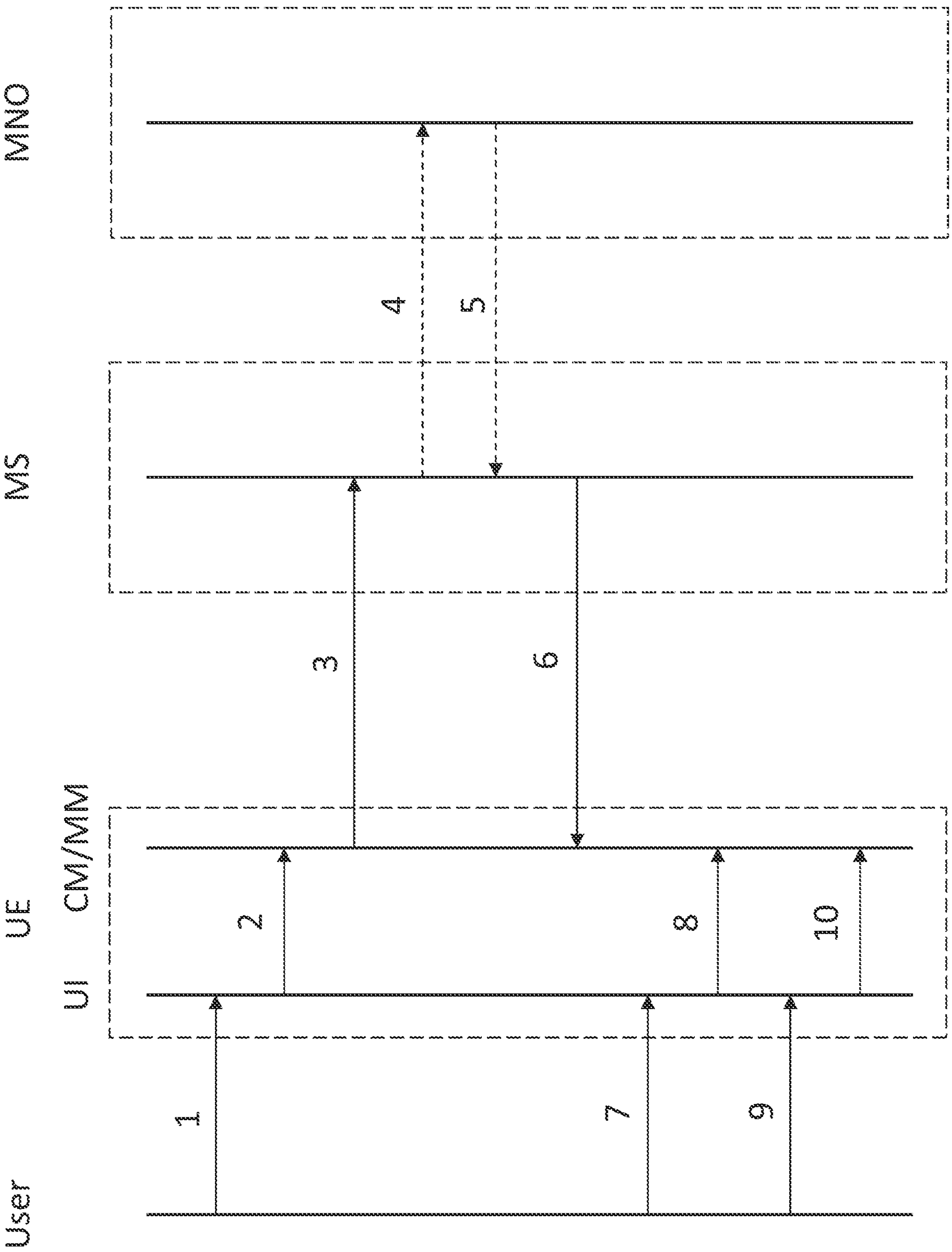
FIG. 3 shows a messaging process for providing a communication function in a user equipment according to embodiments described herein.

FIG. 3 shows a messaging process for providing a communication function in a user equipment according to embodiments described herein.

FIG. 3 shows schematically a user ("User"), a vehicle ("UE") having a user interface ("UI"), the communication module ("CM") and the management module ("MM"), a management server ("MS"), and an MNO server ("MNO").

The communication module CM and the management module MM can be integrated in a single hardware and/or software module. In further embodiments, the communication module CM and the management module MM can be provided as separate hardware and/or software modules.

The management module MM (e.g., the eSIM "brain" in the vehicle) handles the communication between the management server MS (e.g., a backend of the OEM or a 3rd party backend that performs the same function as the OEM backend) and the communication module CM in the vehicle in which the LPA, modem and SIM card are installed.

In the following, exemplary tasks of the management module MM are described.

Task 1: Download an eSIM profile

The user logs in to the vehicle (arrow 1). Based on the login, the vehicle recognizes the user. The management module MM is notified about the login (arrow 2) and checks whether eSIM functionalities have been previously enabled for the user (e.g., via a so-called onboarding). If not, the user may be directed to the account-federation with his/her MNO to enable eSIM functionalities.

If eSIM functionalities are enabled (e.g., due to a general setup and/or account settings), the management module MM checks whether the user has already loaded an eSIM profile or not. If the user has loaded an eSIM profile, the process continues with Task 2 (enable eSIM profile). If the user has not yet loaded an eSIM profile e.g. because the eSIM profile has been lost or deleted, or the user is sitting in this vehicle for the first time, a new eSIM profile should be loaded for this user. To do this, the management module MM takes vehicle information, SIM card information and user information and requests an activation code from the management server MS (arrow 3).

The management server MS now exchanges information with the MNO (arrow 4) and receives an activation code (arrow 5). The management server MS sends the activation code to the management module MM (arrow 6).

Before the management module MM sends the activation code to the LPA of the communication module CM, the management module MM checks whether there is enough space left on the SIM card to install another eSIM profile.

Task 2: Activate eSIM profile (enable)

Each time the user logs in, the corresponding eSIM profile must be enabled. The reason for this is that the eSIM profiles must be disabled for security reasons when the user logs out. To enable the eSIM profile (either the previously stored eSIM profile or the downloaded new eSIM profile), the management module MM sends a profile ID to the LPA of the communication module CM. The LPA enables the eSIM profile and then sends the result to the management module MM. The management module MM send this information as well as other status information of the SIM card and the eSIM profile to the management server MS.

Task 3: Deactivate eSIM profile (disable)

Each time the user logs out (arrows 9 and 10), the corresponding eSIM profile must be disabled. The reason for this is that the profiles must be protected in case of absence. This is not necessary for a cell phone or a watch, as these devices are not passed on to other users.

The management module MM instructs the LPA to disable the eSIM profile. The LPA disables the eSIM profile and then sends the result to the management module MM. The management module MM sends the result as well as other status information of the SIM card and the profile to the management server MS. In case of a successful disablement the process is finished. In case of an unsuccessful disablement or error a deletion process is triggered, because an eSIM profile that cannot be disabled represents a security risk (see Task 4).

Task 4: Delete eSIM profile

In a first example, if the user wants to delete an eSIM profile (in the car, via app, etc.; arrows 7 and 8), then the management module MM sends a delete command to the LPA to delete this very eSIM profile.

In a second example, one of multiple users logs in to the vehicle and wants to load an eSIM profile. If there is not enough memory on the SIM card, an eSIM profile must be deleted first. After deleting the eSIM profile, a new eSIM profile can be install on the SIM card.

In a third example, the management module MM can delete eSIM profiles which are installed but not assigned to any specific users.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing a communication function in a user equipment, the method comprising:

receiving, at the user equipment, a login request to log a user in to the user equipment;

determining, by the user equipment, based on the login request, whether the user equipment has a communication profile associated with the user;

upon determining that the user equipment has the communication profile associated with the user, enabling the communication profile;

upon determining that the user equipment does not have the communication profile associated with the user:

sending, by the user equipment, a first request to a first server to request support information for obtaining the communication profile associated with the user, wherein the first server is a server or a backend of an Original Equipment Manufacturer of the user equipment for managing the user equipment and has stored a user profile of the user;

receiving, at the user equipment, the support information directly from the first server; and obtaining, by the user equipment, the communication profile from the first server or a second server based on the support information, wherein the support information includes an activation code for the communication profile.

2. The method of claim 1, further comprising:

enabling, by the user equipment, the communication profile obtained from the first server or the second server.

3. The method of claim 1, wherein the first request includes at least one of user equipment identification information, Subscriber Identity Module information, or user information.

4. The method of claim 1, wherein the support information further includes at least one of Subscriber Identity Module information, a communication profile type, user information, or a confirmation code.

5. The method of claim 1, wherein obtaining, by the user equipment, the communication profile from the first server or the second server based on the support information includes:

sending, by the user equipment, a second request to the first server to request a download of the communication profile from the first server, or sending, by the user equipment, a second request to the second server to request a download of the communication profile from the second server.

6. The method of claim 1, wherein obtaining, by the user equipment, the communication profile from the first server or the second server based on the support information includes:

sending, by the user equipment, a second request to the first server to request a download of the communication profile from the first server, wherein the first server obtains the communication profile from the second server; or sending, by the user equipment, a second request to the second server to request a download of the communication profile from the second server.

7. The method of claim 1, further comprising:

determining, by the user equipment, whether sufficient memory is available for installation of the communication profile.

8. The method of claim 7, further comprising:

upon determining that sufficient memory is available, installing the communication profile obtained from the first server or the second server.

9. The method of claim 7, further comprising:

upon determining that sufficient memory is not available, deleting at least one other communication profile stored in the user equipment; and installing the communication profile obtained from the first server or the second server.

10. The method of claim 9, wherein the at least one other communication profile comprises at least one of an unknown communication profile, a least used communication profile, a recently least used communication profile, or an oldest communication profile.

11. The method of claim 1, further comprising:

receiving, at the user equipment, a logout request to log the user out; and disabling the communication profile.

12. The method of claim 1, further comprising:

receiving, at the user equipment, a logout request to log the user out, wherein the logout request is received via user input or automatically triggered by one or more events; and disabling the communication profile.

13. The method of claim 1, further comprising:

receiving, at the user equipment, a communication profile deletion request; and deleting the communication profile according to the communication profile deletion request.

14. The method of claim 1, further comprising:

receiving, at the user equipment, a communication profile deletion request, wherein the deletion request is received via user input or automatically triggered by one or more events; and deleting the communication profile according to the communication profile deletion request.

15. A computer product comprising a non-transitory computer-readable storage medium having stored thereon program code, that, when executed on a processor, carries out the method according to claim 1.

* * * * *